United States Patent
Lee

(10) Patent No.: US 7,118,174 B2
(45) Date of Patent: Oct. 10, 2006

(54) ACTIVATING HEADREST

(75) Inventor: Keun-Bae Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,218

(22) Filed: Dec. 30, 2003

(65) Prior Publication Data

US 2004/0245814 A1    Dec. 9, 2004

(30) Foreign Application Priority Data

Jun. 3, 2003    (KR) .................... 10-2003-0035590

(51) Int. Cl.
    *B60N 2/42* (2006.01)
(52) U.S. Cl. ............................. 297/216.12; 297/216.14
(58) Field of Classification Search ........... 297/216.12, 297/216.13, 216.14, 216.19, 284.7
    See application file for complete search history.

(56) References Cited

U.S. PATENT DOCUMENTS

| | | | | |
|---|---|---|---|---|
| 1,291,975 A | * | 1/1919 | Schlosstein | 297/230.14 |
| 2,973,029 A | * | 2/1961 | Schlosstein | 297/216.12 |
| 5,378,043 A | | 1/1995 | Viano et al. | |
| 5,795,019 A | * | 8/1998 | Wieclawski | 297/216.12 |
| 5,842,738 A | * | 12/1998 | Knoll et al. | 297/216.12 |
| 5,884,968 A | * | 3/1999 | Massara | 297/216.12 |
| 5,927,804 A | | 7/1999 | Cuevas | |
| 5,934,750 A | * | 8/1999 | Fohl | 297/216.12 |
| 6,024,406 A | | 2/2000 | Charras et al. | |
| 6,135,561 A | | 10/2000 | Kruger et al. | |
| 6,199,947 B1 | * | 3/2001 | Wiklund | 297/216.12 |
| 6,375,262 B1 | * | 4/2002 | Watanabe | 297/284.4 |
| 6,779,840 B1 | * | 8/2004 | Farquhar et al. | 297/216.12 |
| 6,783,177 B1 | * | 8/2004 | Nakano | 297/216.12 |
| 2002/0053819 A1 | * | 5/2002 | Itoh | 297/216.13 |
| 2003/0015897 A1 | | 1/2003 | Humer et al. | |
| 2004/0155496 A1 | * | 8/2004 | Farquhar et al. | 297/216.12 |

\* cited by examiner

*Primary Examiner*—Peter M. Cuomo
*Assistant Examiner*—Joseph Edell
(74) *Attorney, Agent, or Firm*—Morgan Lewis & Bockius LLP

(57) ABSTRACT

An activating headrest comprises a headrest including a detecting link integrally connected to the headrest. The detecting link is pivotally mounted to a seat frame so as to be shifted when pressed by an occupant's back. A return spring is installed between the detecting link and the seat frame. A stopper means installed between the seat frame and the detecting link fixes the state of the headrest tilted in the forward and upward position to prevent the neck from being thrust backward.

3 Claims, 7 Drawing Sheets

ACTIVATING HEADREST

CROSS-REFERENCE TO RELATED APPLICATIONS

This application claims priority of Korean Application No. 10-2003-0035590, filed on Jun. 3, 2003, the disclosure of which is incorporated fully herein by reference.

FIELD OF THE INVENTION

Generally, the present invention relates to a vehicle seat headrest. More particularly, the headrest is automatically activated upon a rear collision to minimize whiplash injury to the neck of an occupant.

BACKGROUND OF THE INVENTION

Typically, during vehicle collisions from behind, the occupant's head is thrust backward with such inertia that the neck becomes strained. Many neck injuries occur from this motion.

Accordingly, a safety device designed to minimize injury to the occupant's neck during a rear collision would be advantageous.

SUMMARY OF THE INVENTION

According to an embodiment of the present invention an activating headrest is adapted to effectively limit movement of an occupant's chest and head in relation to their neck in the event of a rear collision, thereby improving the safety of a vehicle.

In another embodiment, an activating headrest comprises a headrest and a detecting link integrally linked to the headrest. The headrest is pivotally mounted to a seat frame so that the detecting link shifts when it is pressed by an occupant's back as a result of a rear impact. A return spring is installed between the detecting link and the seat frame. A stopper means is installed between the seat frame and the detecting link and fixes the headrest in an upward and forward position to prevent the occupants head from being thrust backward.

BRIEF DESCRIPTION OF THE DRAWINGS

For a better understanding of the nature and objects of the present invention, reference should be made to the following detailed description, read in conjunction with the accompanying drawings, in which.

DETAILED DESCRIPTION OF PREFERRED EMBODIMENTS

Figure 1:
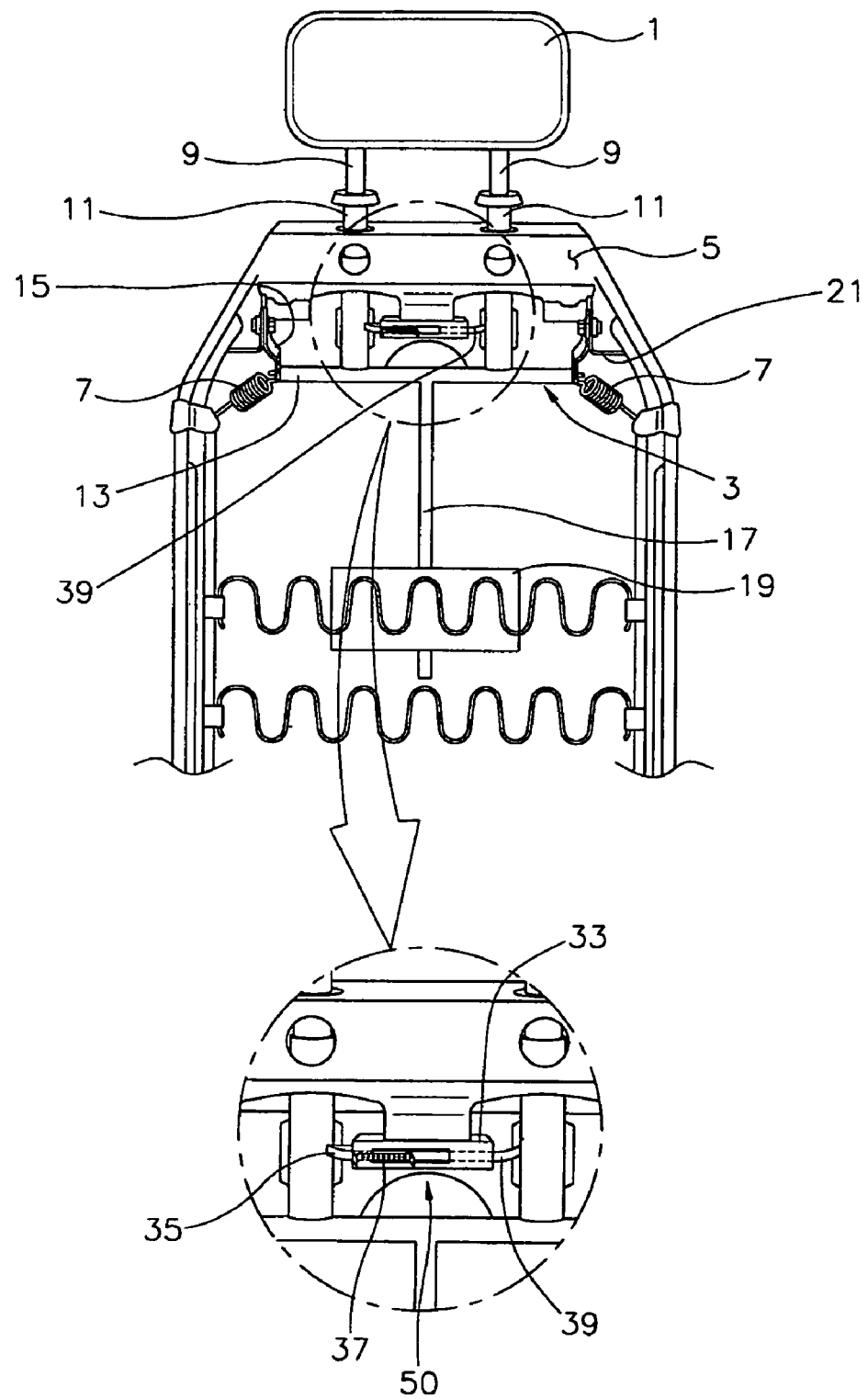
FIG. 1 illustrates a frontal view of an activating headrest of a vehicle seat according to an embodiment of the present invention.
Figure 3:
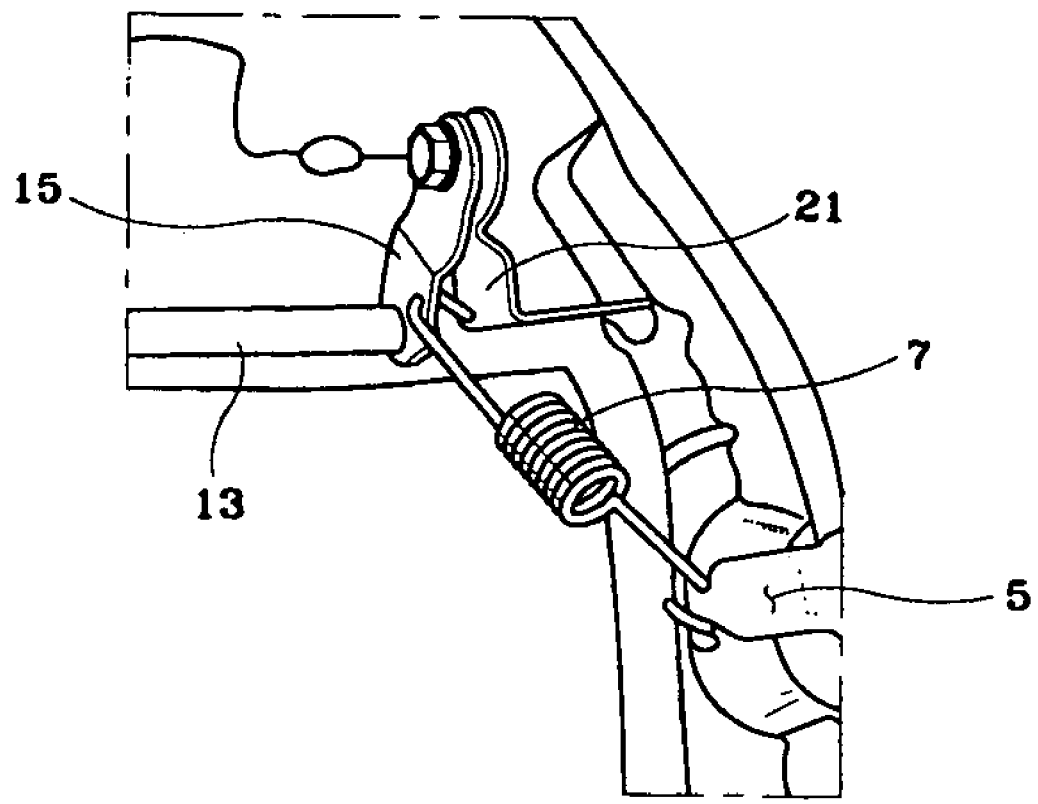
FIG. 3 is a detailed view of a return spring installed between a detecting link and a seat frame according to an embodiment of the present invention.

A detecting link 3 is integrally linked to a headrest 1 and pivotally mounted to a seat frame 5. The detecting link 3 shifts when it is pressed by an occupant's back, for example during to a rear impact. The detecting link 3, shown in greater detail in FIG. 3, is resiliently supported and fixed to the seat frame 5 via a return spring 7. A stopper means 50, FIG. 1, is placed between the seat frame 5 and the detecting link 3 for fixing tilted headrest 1 in an upward and forward position to prevent the head of an occupant from being thrust backward.

The detecting link 3 comprises a headrest supporting pipe 11 into which a headrest rod 9, which protrudes out at the bottom of the headrest 1, is inserted. A horizontal rod 13 is fixed to the bottom end of the headrest supporting pipe 11, and a pivot arm 15 is installed at both ends of the horizontal rod 13. A detecting rod 17 protrudes toward the bottom of the horizontal rod 13, and a detecting plate 19 is installed at the detecting rod 17.

The pivot arm 15 is secured via a hinge to a supporting bracket 21, which is integrally fixed to the seat frame 5, such that the detecting link 3 can pivot in relation to the seat frame 5.

Figure 4:
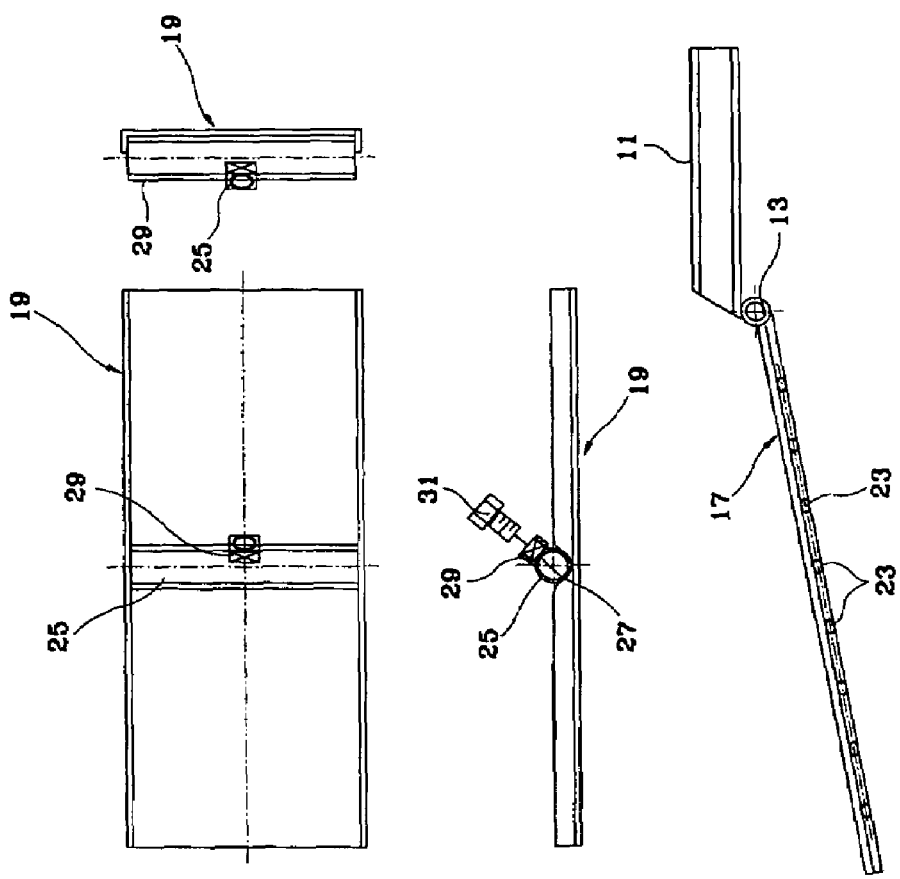
FIG. 4 illustrates a detecting plate installed at a detecting rod of the detecting link according to an embodiment of the present invention.

As shown in FIG. 4, the detecting rod 17, disposed underneath the detecting link 3, has a plurality of fixing holes 23. The detecting plate 19 is integrally mounted with an insertion pipe 25 for allowing the detecting rod 17 to be inserted therein. The insertion pipe 25 has a location determining hole 27 and a welding nut 29. The welding nut 29 is fastened by a fixing bolt 31 for fixing the location of the detecting plate 19 in relation to the detecting rod 17. The fixing bolt 31 is unscrewed for adjusting the location of the detecting plate 19, and the location thereof can be secured by screwing the fixing bolt 31.

The stopper means 50 includes a linear guide 33 fixed to the seat frame 5. The linear guide 33 guides linear movement in relation to the vertical plane shifting range of the detecting link 3. A slider 35 is guided by the linear guide 33. A sliding surface of the slider 35 is in contact with the detecting link 3 in relation to a shifting direction of the detecting link 3, which pivots by being pushed by the back of an occupant. The slider 35 also prevents the detecting link 3 from shifting to a direction opposite to the above movement. A slider spring 37 (FIG. 5) resiliently supports the slider 35 for restricting a one-direction shift of the detecting link 3. A releasing cable 39 (FIGS. 1 and 2) couples, at one end, to the slider 35 such that the slider 35 is urged in the direction opposite to that which the slider spring 37 resiliently supports.

The slider 35 interacts with one headrest supporting pipe 11 (FIG. 5) of the detecting link 3 so as to allow the detecting link 3 to shift in only one direction. The slider 35, which makes contact with the headrest supporting pipe 11, has a sliding surface 41 in the frontal view while the rear view thereof has a flat surface vertical to the shifting plane of the headrest supporting pipe 11. This configuration allows the detecting link 3 to shift only when the headrest supporting pipe 11 contacts with the sliding surface 41 of the slider 35. Once the headrest supporting pipe 11 is shifted to contact with the flat surface of the slider 35, the headrest supporting pipe 11 is restrained from shifting.

Figure 5:
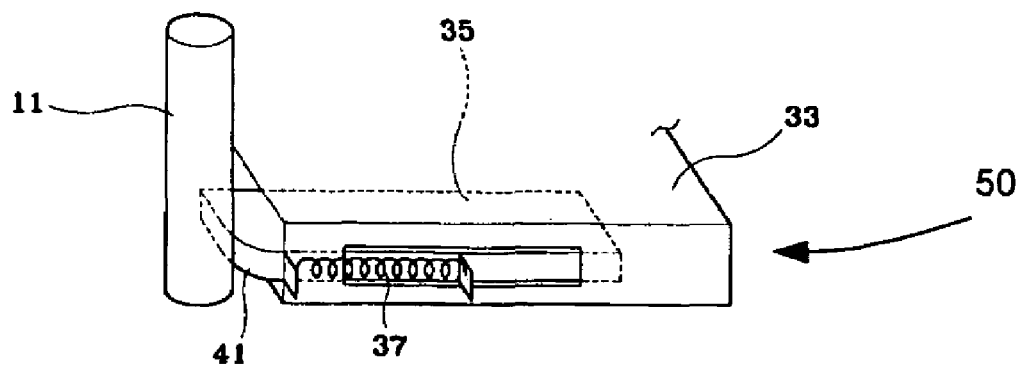
FIG. 5 illustrates an initial state of a stopper means illustrated in FIG. 1.
Figure 6:
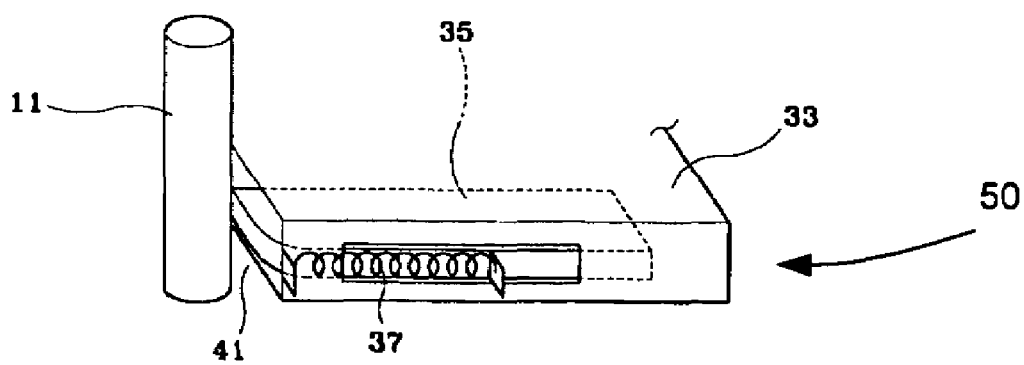
FIG. 6 illustrates an operational state of the stopper means during a shift of a headrest supporting pipe according to an embodiment of the present invention.
Figure 7:
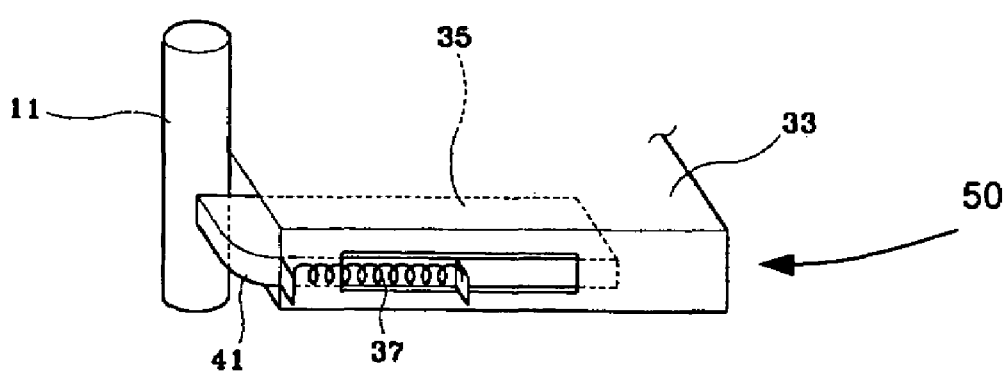
FIG. 7 illustrates the stopper means after the headrest supporting pipe finishes shifting according to an embodiment of the present invention.
Figure 8:
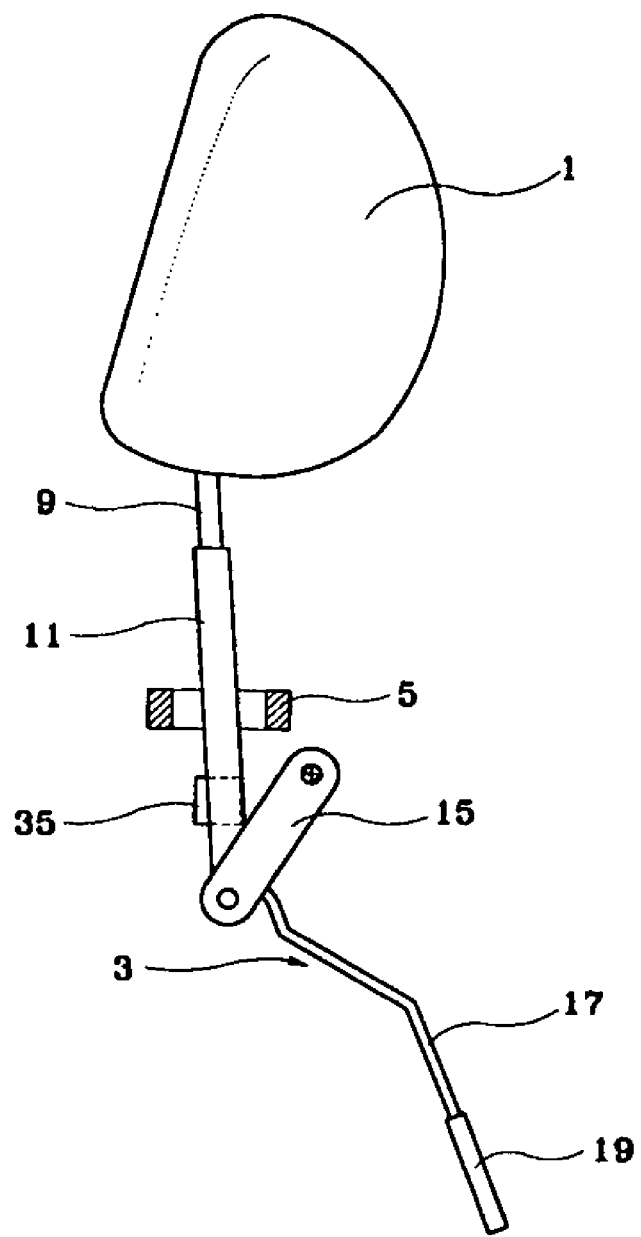
FIG. 8 is a side view illustrating a headrest and a detecting link in an initial state according to an embodiment of the present invention.

With reference to FIG. 3, the pivot arm 15, shown underneath the hinge that pivotally supports the detecting link 3, is initially tilted forward via the return spring 7. Thus, the detecting plate 19 is also initially tilted in a forward position with the headrest 1 in an upright position (hereinafter referred to as "initial state"). The rear part of the headrest supporting pipe 11 faces the sliding surface 41 of the slider 35 in the initial state, as shown in FIGS. 5 and 8. When a rear impact occurs, an occupant's torso is pushed backward by the force of inertia, such that the occupant's back pushes against the detecting plate 19, causing the detecting link 3 to start shifting. Once the detecting plate 19 forces the detecting link 3 to shift, the headrest supporting pipe 11 pushes the sliding surface 41 of the slider 35. Next, the slider 35 slides down by overcoming the elastic force of the sliding spring 37, thereby allowing the detecting link 3 to shift position.

Figure 9:
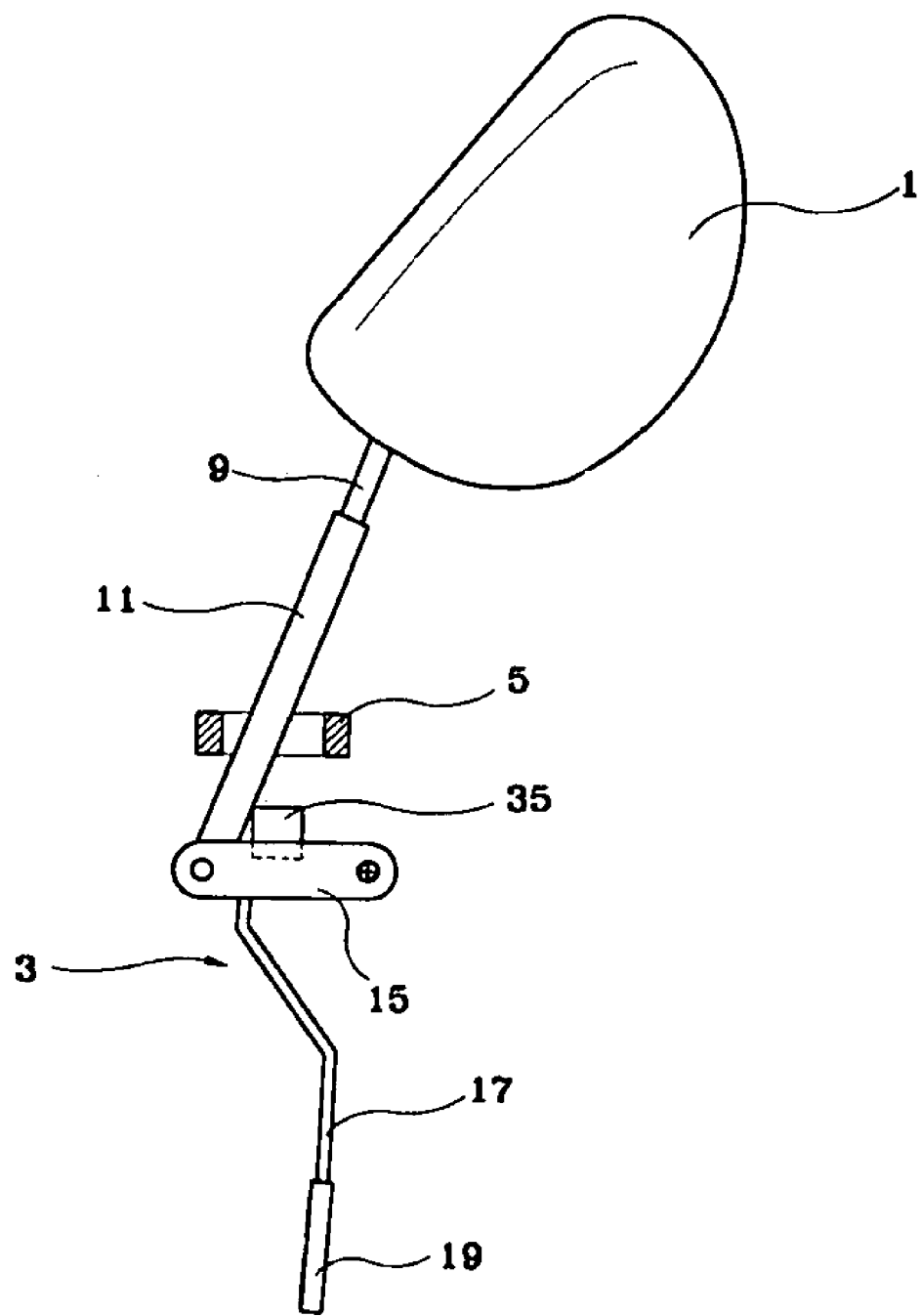
FIG. 9 is a side view illustrating the shifted state of the headrest and the detecting link during a rear crash according to an embodiment of the present invention.

According to FIGS. 8 and 9, the detecting link 3 is integrally linked to the headrest and fixed to the seat frame 5 via the hinged the pivot arm 15. This arrangement allows the headrest to shift in an upward and forward position in response to the shifting of the detecting link 3. Thereby, the headrest effectively supports the head of the occupant during a rearward occurring vehicle collision.

Figure 2:
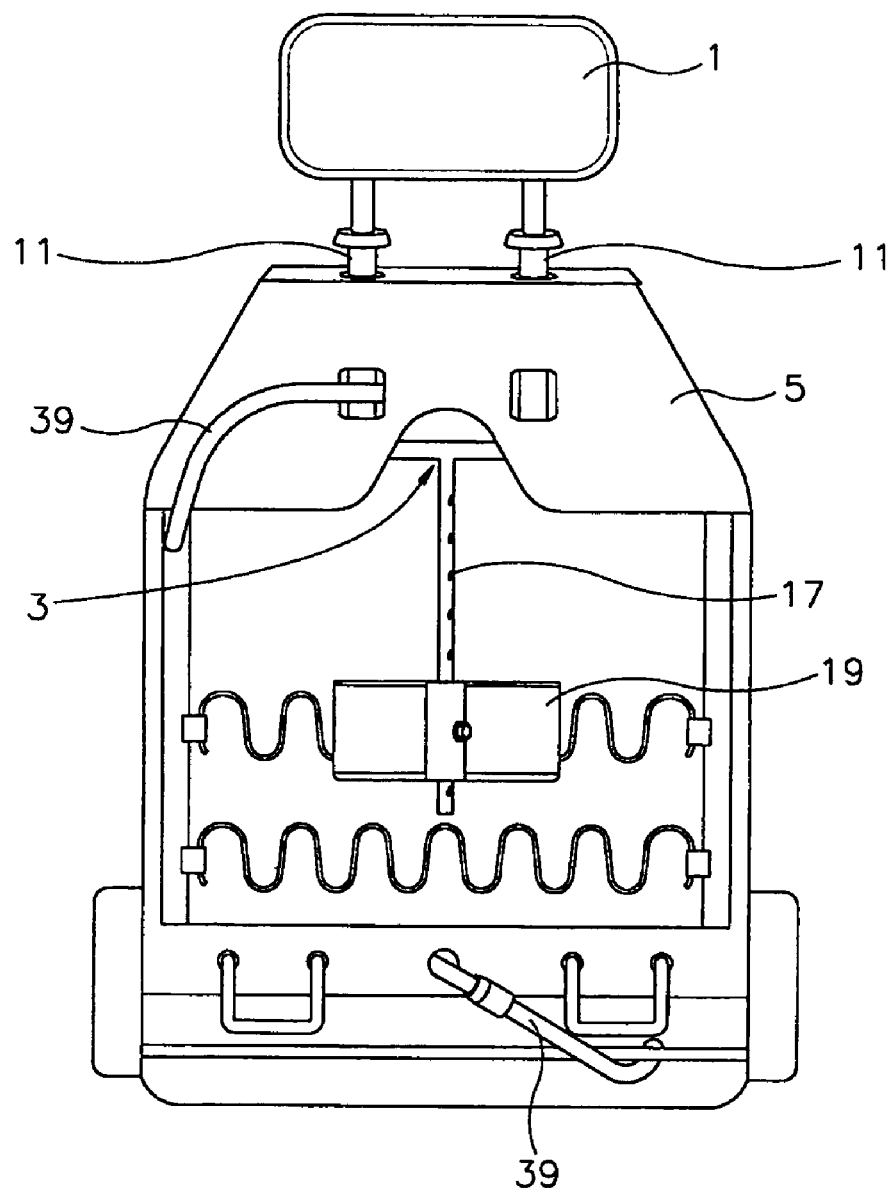
FIG. 2 is a rear view of the seat of FIG. 1.

During a typical rearward collision an occupant's body is pushed backward, as described above, and then thrust forward again from the seat. When the occupant's back is thrust forward and away from the detecting plate 19, the detecting link 3 returns to the initial state via the return spring 7. However, the front part of the headrest supporting pipe 11 makes contact with the vertical surface of the rear part of the slider 35, which prevents the detecting link 3 from returning to its initial state. Thus, the tilted headrest constantly supports the occupant's head, thus minimizing whiplash injury to the neck of the occupant. After a vehicle accident has occurred, the release cable 39 may be manually pulled to return the detecting link to its initial state and thus facilitating maintenance of the vehicle without having to disassemble the seat. The releasing cable 39 may alternatively be placed at one end towards the rear of the seat as shown in FIG. 2, or in another location.

What is claimed is:

1. An activating headrest comprising:
   a headrest;
   a detecting link integrally linked to said headrest and pivotally mounted to a seat frame to pivot in a vertical pivoting range plane when pressed by a back of an occupant, wherein said detecting link comprises:
      a headrest supporting pipe into which a headrest rod, protruding out at said headrest, is inserted;
      a horizontal rod for being fixed with the lower end of said headrest supporting pipe;
      a pair of pivot arms installed at both ends of said horizontal rod;
      a detecting rod protruded underneath said horizontal rod, wherein said detecting rod has a plurality of fixing holes at a constant interval; and
      a detecting plate installed at said detecting rod, wherein said detecting plate is integrally mounted with an insertion pipe for allowing said detecting rod to be inserted therein;
         wherein said insertion pipe has a location determining hole and a welding nut, and said welding nut is fastened with a fixing bolt for fixing the location of said detecting plate in relation to said detecting rod;
   a return spring installed between said detecting link and said seat frame; and means, installed between said seat frame and said detecting link, for fixing a state of said headrest which has been shifted in a forward and upward position, wherein said means for fixing a state of the headrest comprises:
      a slider of which a sliding surface contacts with said detecting link in relation to a pivoting direction of said detecting link being pivoted by the occupant's back, and which prevents said detecting link from pivoting to a direction opposite the pivoting direction;
      a linear guide fixed to said seat frame for guiding a linear movement of said slider in a direction perpendicular to the vertical pivoting range plane of said detecting link; and
      a slider spring for resiliently supporting said slider.

2. The activating headrest as defined in claim 1, wherein a pair of supporting brackets integrally fixed to said seat frame for supporting each of said pair of pivot arms via a pair of hinges is further installed between said pair of pivot arms and said seat frame.

3. The activating headrest as defined in claim 1, wherein one end of a releasing cable further couples to said slider for pulling said slider in a direction opposite to where said slider spring is resiliently supported.

* * * * *